O. MARSHALL.
Unloading Net.
No. 208,189. Patented Sept. 17, 1878.
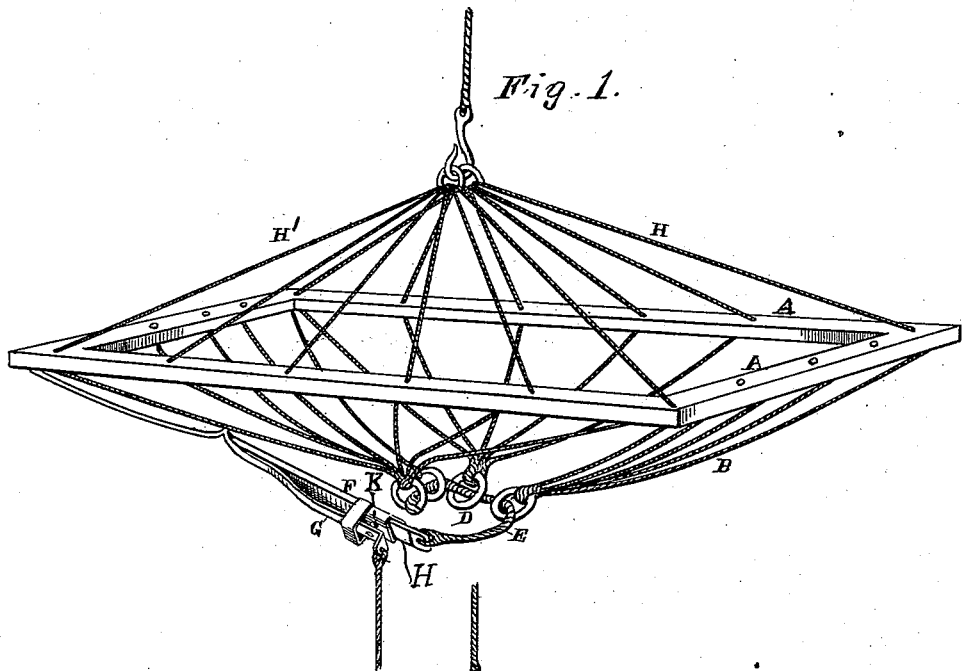
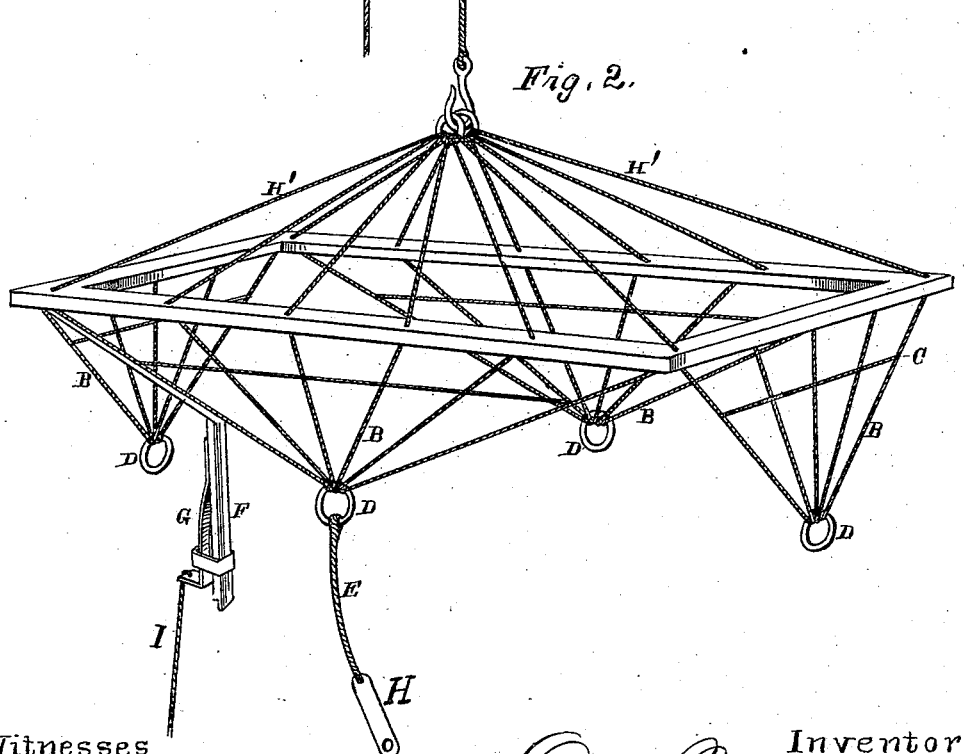
Witnesses
Geo. H. Strong.
Frank A. Brooks
Inventor
Oscar Marshall
by Dewey & Co.
Attys

UNITED STATES PATENT OFFICE.

OSCAR MARSHALL, OF STOCKTON, CALIFORNIA.

IMPROVEMENT IN UNLOADING-NETS.

Specification forming part of Letters Patent No. 208,189, dated September 17, 1878; application filed July 8, 1878.

*To all whom it may concern:*

Be it known that I, OSCAR MARSHALL, of Stockton, county of San Joaquin, and State of California, have invented an Improved Unloading-Net; and I do hereby declare the following to be a full, clear, and exact description thereof, reference being had to the accompanying drawings.

My invention relates to that class of devices for unloading wagons in which a netting is placed in the bottom of the wagon, so that the load of grain or other material can be piled upon it, and, when desired, the load can be lifted in bulk from the wagon by means of a derrick, and by an arrangement in the construction of the net can be dropped or deposited as required.

My improvements consist in making a rigid rectangular frame, to which the net is attached, said net being made in four triangular or V-shaped sections, each section having a ring at its end. Attached to one of these rings is a short cord with a catch on one end. This rope or cord is rove through the rings, bringing the sections together to form one net, and the catch is then inserted into a peculiar snap, which holds it. A draw-cord is attached to this catch, so that when the net is loaded and it is desired to drop it, by pulling on this draw-cord the snap is released, releasing thereby the short rope and the rings, and the load falls. The rectangular frame sustaining the netting is lifted by means of appropriate fastenings, so arranged as to raise the frame up even.

Referring to the accompanying drawings, Figure 1 is a perspective view of my net closed. Fig. 2 is a view showing it opened.

Let A represent a rigid rectangular frame having holes bored at intervals through the sides and ends, into which the ropes forming the nettings are secured. To each side and end is secured, by means of the holes or otherwise, a V-shaped netting, B, having cross braces or cords C extending across them, so as to hold grain or straw more readily, and prevent it falling through the meshes. At the lower point of each section of netting is secured a ring, D, and to one of these rings is secured the draw-cord E, having a catch, H, on its outer end. This draw-cord is passed consecutively through the other rings, so as to draw the ends of the sections together and form a complete net or basket, which contains the load to be moved.

To the frame is secured, by a rope or other flexible material, the snap-latch F. This snap is made hollow, and has on one side a spring, G, with a lug, H, upon it, said lug projecting into the hollow latch. The end of this spring is turned up and has a hole in it, to which may be attached a rope, I, for releasing the catch. The catch H on the end of the rope or draw-cord E is beveled off, so that it may be pushed into the end of the hollow latch and slide past the lug K, when the spring forces the lug into the hole in the end of the catch, and thus secures it in place.

After the load is raised and is in position ready to be deposited, by pulling on the cord I and drawing the lug out of the hole in the catch the catch is released and the draw-cord pulls the latch and catch apart, and the cord E is drawn through the rings by the weight of the load, which allows the rings to separate and the four portions of netting to swing away from each other at right angles, so that the load is freed and a clear opening made for it to drop through.

The four parts of the netting, after the load is deposited, hang vertically from the sides of the frame, and are readily gathered together and secured by passing the draw-cord through the rings, after which the catch is inserted in the latch and the net is placed in the wagon, ready to receive another load.

I suspend my net by placing two V-shaped sections of netting, H', on opposite sides of the frame, so that the rings on their ends will meet above, and a clutch or hook can be inserted in them readily. In threading the rings of the netting B the draw-cord should reeve through them successively, so that when the catch is released the rope will be withdrawn by the strain in a direct manner, thus avoiding any catch or kink that might otherwise occur.

I have shown the cords of the net extending through and above the frame, meeting in rings, into which the pulley-block of the derrick may be hooked; but any suitable device for lifting can be employed.

Having thus described my invention, what I claim as new, and desire to secure by Letters Patent, is—

The rectangular frame A, each side having the V-shaped netting B depending from it and provided with the rings D, the draw-cord E, provided with the catch H, and fitted to pass through the rings consecutively, the spring-locking device, and the V-shaped sections H' H' of netting on opposite sides of the frame, having rings at their ends, the several parts constructed and relatively arranged to operate substantially as herein shown and described.

In witness whereof I hereunto set my hand and seal.

OSCAR MARSHALL. [L. S.]

Witnesses:
 EUGENE LEHE,
 E. E. WASHBURN.